Dec. 15, 1959  C. M. LAFFOON ET AL  2,917,644
INNERCOOLED TURBINE GENERATORS
Filed March 21, 1957  3 Sheets-Sheet 1

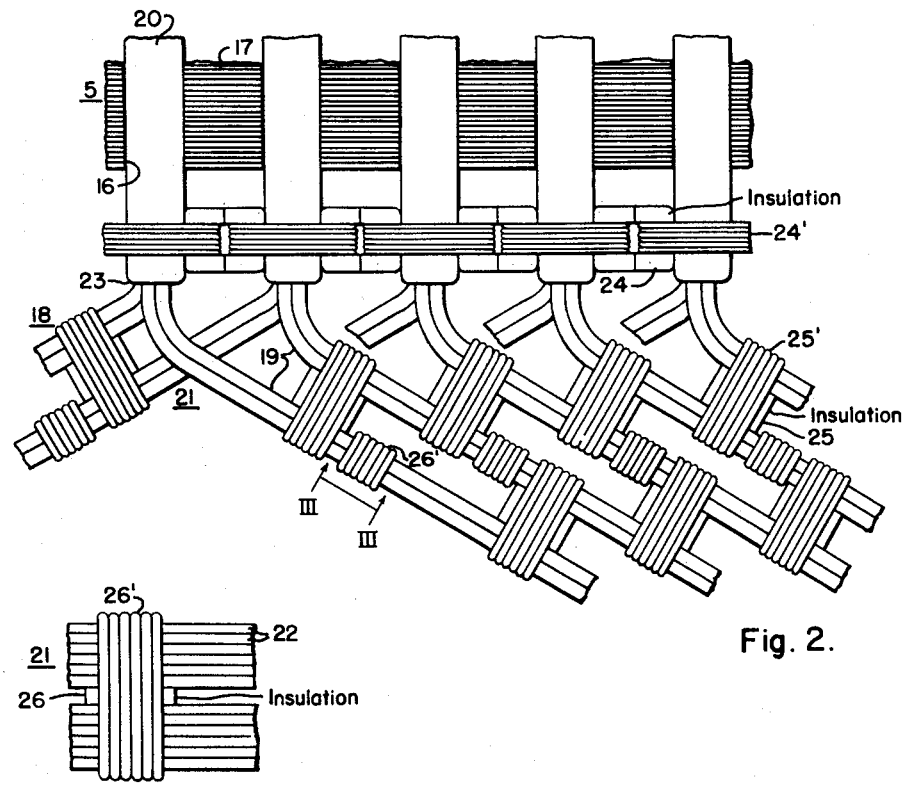
Fig. 2.
Fig. 3.
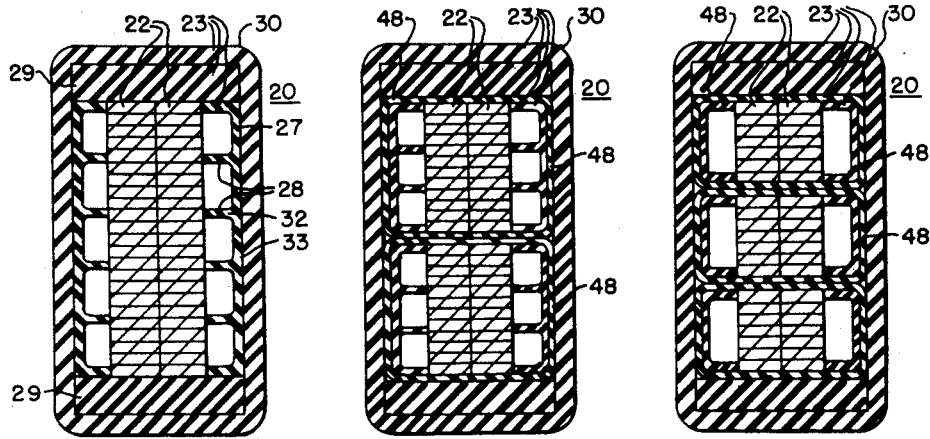
Fig. 4.    Fig. 5.    Fig. 6.

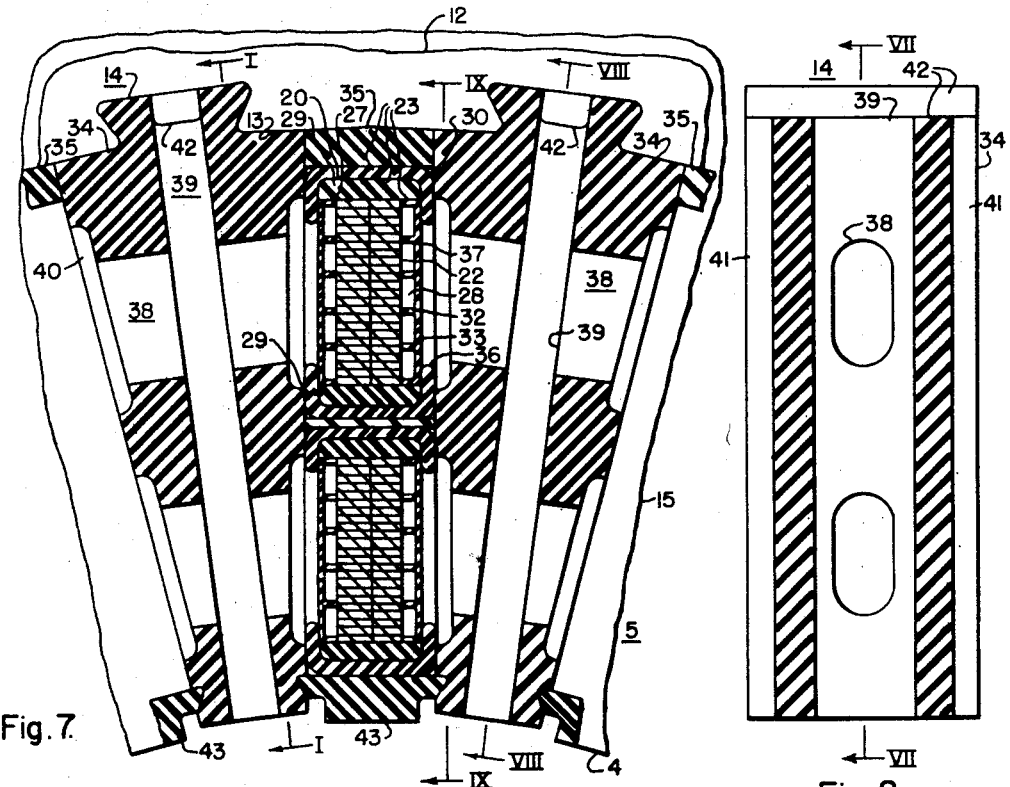
Fig. 7.
Fig. 8.
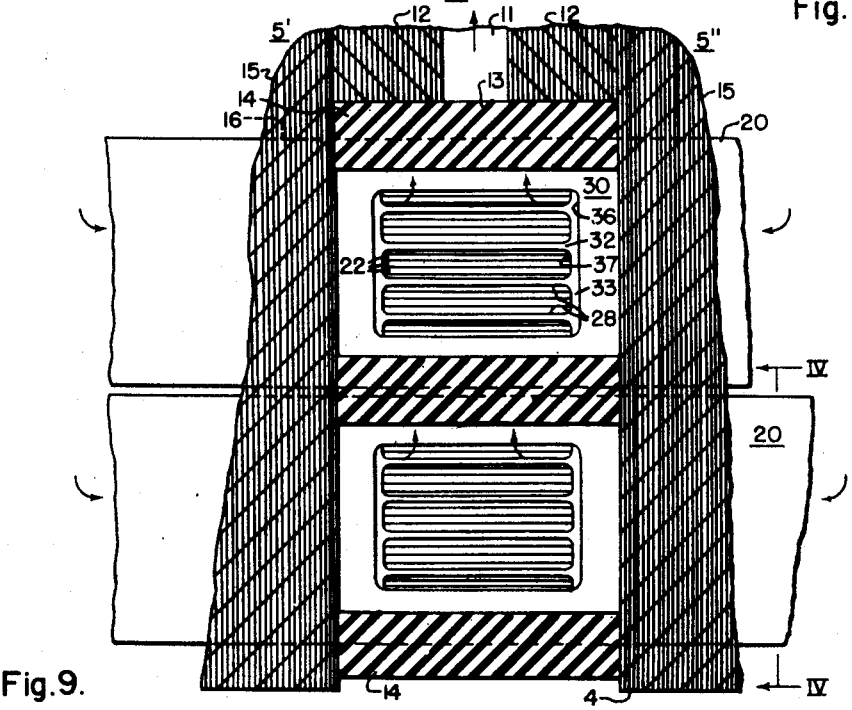
Fig. 9.

United States Patent Office 2,917,644
Patented Dec. 15, 1959

2,917,644

INNERCOOLED TURBINE GENERATORS

Carthrae M. Laffoon, El Cajon, Calif., and Graham L. Moses, Pittsburgh, Pa., assignors to Westinghouse Electric Corporation, East Pittsburgh, Pa., a corporation of Pennsylvania Application March 21, 1957, Serial No. 647,658

6 Claims. (Cl. 310—64)

Our invention relates to improvements in innercooled turbine generators of the general type shown in the Baudry application Serial No. 248,853, filed September 28, 1951, the Baudry and Heller application Serial No. 248,852, filed September 28, 1951, now Patent No. 2,780,739, issued February 5, 1957, and the Baudry Patent 2,707,242, granted April 26, 1955.

Our invention consists in various improvements resulting in increases in the efficiency, the reliability, and the voltage-ratings of the stator windings of such machines. One of these improvements takes the form of innercooling stator-winding ducts which are provided in the body of the thick ground-insulation which surrounds the coil-sides of the stator-winding, these ducts being formed as open channels in the insulation, with the open sides of the channels facing against the compact stacks of conductor-strands, thereby increasing the maximum feasible voltage-rating to from 24 to 69 kilovolts. Another of these improvements relates to a novel insulating diverter which constitutes the first really practical means which makes possible the use of the axial double-flow principle, or the multiple-flow principle in general, for the innercooled stator windings of turbine generators, thereby essentially cutting the effective length of the stator-core in half, or in thirds, quarters, or the like, so far as the effective cooling is concerned, thus obtaining a very material increase in the output which can be obtained, as compared to the results obtainable from a single-flow system.

With the foregoing and other objects in view, our invention consists in the combinations, parts, structures and methods of design and operation, hereinafter described, and illustrated in the accompanying drawings, which illustrate, in somewhat schematic fashion, not to scale, the general principles of our invention. In the drawings:

Fig. 2 is a developed inner view of a portion of the stator end-windings, as viewed from the cylinder indicated by the line II—II of Fig. 1;

Fig. 3 is a detail of the end-winding bracing, looking from the plane III—III in Fig. 2;

Fig. 4 is a transverse sectional view through the coil-side of a single-turn stator-coil, suitable for a voltage-rating between 13,800 and 24,000 volts, the section-plane being indicated at IV—IV in Fig. 9;

Fig. 5 is a view, similar to Fig. 4, showing the coil-side of a two-turn coil, suitable for a voltage-rating between 24 and 44 kilovolts;

Figure 1:
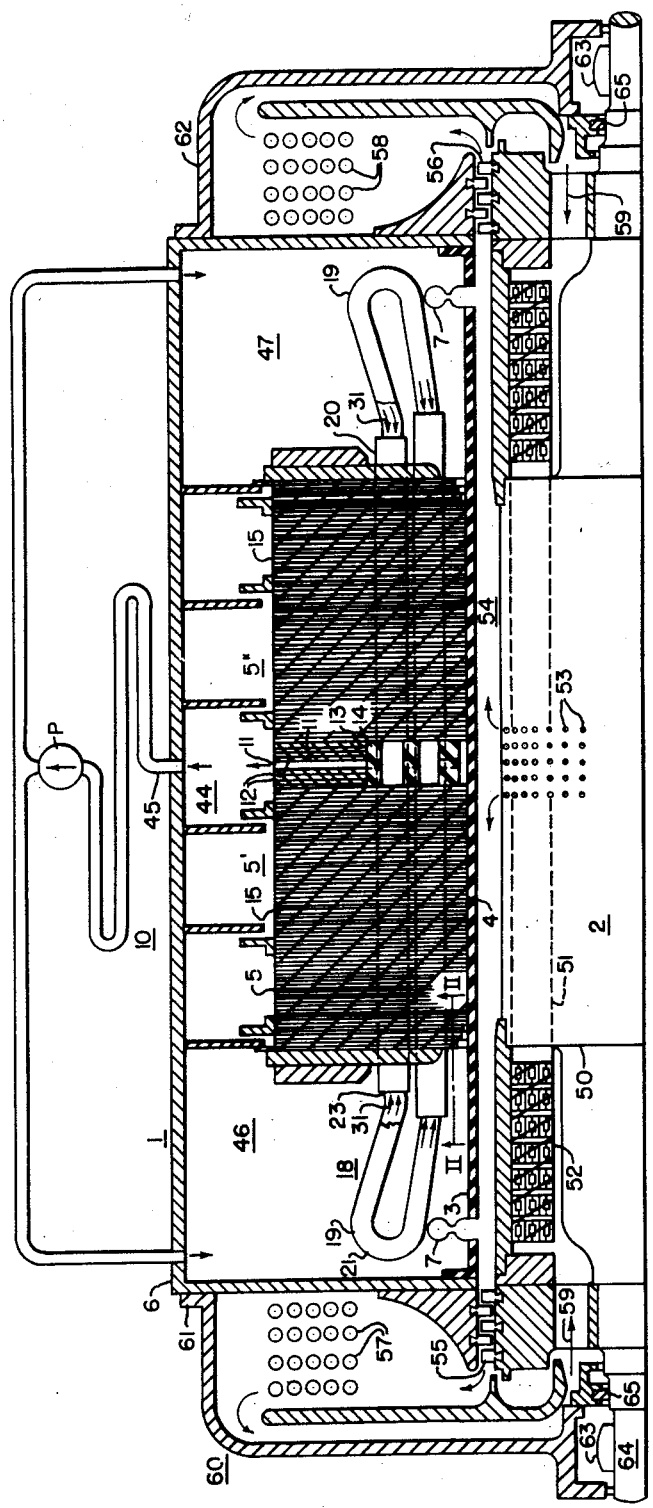
Figure 1 is a somewhat diagrammatic simplified longitudinal section of the top half of a turbine generator illustrating our invention, the section-plane being indicated by the line I—I of Fig. 7.

Fig. 6 is another view, similar to Fig. 4 illustrating the manner of construction of the coil-side of a coil having from 3 to 5 turns, suitable for a voltage-rating between 33 and 69 kilovolts;

Fig. 7 is a fragmentary transverse sectional view through the stator-core, at the place occupied by the diverter, a section plane being indicated by the line VII—VII of Fig. 8;

Fig. 8 is a longitudinal section view through one of the insulating teeth or tooth-fillers of the diverter, the section-plane being a radial axial plane indicated by the line VIII—VIII of Fig. 7; and Fig. 9 is a fragmentary longitudinal sectional view of a portion of the stator core, looking toward a coil-side which lies within one of the winding-receiving stator-core slots, as seen from the edge of one of the diverter teeth, as indicated by the plane IX—IX in Fig. 7.

While our invention is applicable to dynamo-electric machines, in general, it has particular applicability to large, high-voltage turbine-generators, usually of the two-pole 60-cycle type, as shown in Fig. 1. Such a machine has a stator member 1 and a rotor member 2, both of which are innercooled, or provided with windings in which the conductors are directly cooled by a suitable cooling fluid. In the illustrative example which is shown in Fig. 1, the stator member 1 is divided off from the rotor member 2 by means of a stiff cylindrical insulating partition or tube 3, which lies against the cylindrical bore 4 of the stator-core 5, and which has end-extensions which make a fluid-tight connection with the enclosing housing 6 of the stator member 1. The cylindrical partition 3 is shown as being provided, near each end, with a flexible diaphragm 7.

The effect of the cylindrical partition 3 is to make it possible, as is well known, to use different insulating fluids for innercooling the stator and rotor members, and specifically it makes possible the cooling of the rotor member with a lighter-than-air gas, preferably hydrogen at a pressure of, say, from 45 to 150 pounds per square inch gauge, for example, while cooling the stator with oil or with a gas which is separate from the rotor-cooling gas. In the broader aspects of our invention, however, the cylindrical partition 3 is not necessary, in which case the stator-cooling fluid will have to be the same lighter-than-air gas which is used for cooling the rotor.

In the particular machine which has been chosen for illustration in Fig. 1, the stator-chamber which is provided by the enclosing housing 6 and the cylindrical partition 3 is filled with an insulating oil, which is recirculated through external piping, by means of a pump P. The oil-circulation can be in either direction, and in the course of the circulation, the oil is passed through a heat-interchanger 10 whereby the oil may be cooled.

The stator-core 5, in Fig. 1, is illustrated as comprising two bundles 5' and 5" of stacked magnetizable laminations, with an intermediately disposed radially extending ventilating-space 11 between the bundles. This illustration is intended to be generically representative of a stator-core which is divided into any number of bundles, with an intermediately disposed radial-space 11 between each pair of successive bundles. The stacked stator-core laminations 12 which immediately adjoin the radial space 11, on both sides of said space, have a large bore 13, which receives an insulating diverter-means 14, which will be subsequently described. The rest of the stator-core laminations, 15, are provided with a cylindrical bore which is the cylindrical bore 4 of the stator-core 5. In this bore 4, the stator-core 5 is provided with a plurality of circumferentially spaced, axially extending, radially deep, conductor-receiving core-slots 16, which are provided between stator-core teeth 17.

The stator member 1 is provided with a high-voltage alternating-current stator-winding 18, consisting of a plurality of coils 19, each coil consisting of two straight coil-sides 20 which lie in a pair of spaced core-slots 16, and circumferentially extending end-turn portions 21 at the respective ends of the coil-sides, that is, at the respective ends of the stator-core 5. The stator-winding 18 is illustrated in the usual form of a two-layer winding, that is, a winding having the coil-sides 20 of two different stator-coils lying one over the other in each stator-core slot 16.

Preferably, the stator-coils 19 are preformed coil-members, usually in the form of previously bent or shaped half-coils, each of which is made up of a compact stacked group of transposed, lightly insulated, conductor-strands 22 which divide the current between them. The transposition of the strands may be either internal, that is, within the straight coil-side portions 20 which lie within the slots 16, or the transposition may be external, or in the end-turn portions 21; or there may be transpositions in both places.

As shown in Fig. 4, each of the coil-sides 20 may preferably consist of two radially piled stacks of these lightly insulated conductor-strands 22, placed close together, in side-by-side relationship, without any space between these two stacks, although we are not limited to this particular arrangement, so long as the stacked strands of each coil-side are all in a compact group, so that at least one edge of each strand lies along a side of the compact group of strands, whereby it can be directly cooled by a means which is disposed along the outside of the compact group, as will be subsequently described.

It is necessary to provide a ground-insulation covering 23 surrounding the straight coil-side portion 20 of each stacked group of lightly insulated conductor-strands 22. The ground-insulation coverings 23 of all of the stator-winding coil-sides 20 are ordinarily all alike in insulating strength and thickness, but it is possible, if it is worth the extra complication, to use graded insulation, dependent upon the position of each coil, in which case at least some of these ground-insulation coverings 23 will have to have an insulating strength and thickness suitable for withstanding at least 10,000 volts between the conductor-strands 22 and ground, that is, between said conductor-strands and the stator-core laminations 15. As a matter of fact, the standard voltage-rating for the smallest turbine generator to which our invention is primarily adapted is 13,800 volts, and the ground-insulation has to have a strength which is enough higher than this rating to withstand the necessary overvoltage acceptance-tests.

In the preferred form of embodiment of our invention, as shown in Fig. 1, these ground-insulation coverings 23 terminate shortly beyond the ends of the stator-core slots, that is, shortly beyond the respective ends of the stator-core 5, leaving suitable insulating creepage-distances back from the bare end-portions of the strands, to the respective ends of the stator-core 5. Thus, the end-turn portions 21 of the stacked groups of lightly insulated conductor-strands 22 are essentially bare, being bare conductors, except for the light insulation which separately covers each conductor-strand, and which does not impose any substantial thermal barrier against the cooling of these end-turns. It is necessary, of course, to use suitable spacing and fastening means, for holding the essentially bare end-turn portions 21 in place, as shown in Figs. 2 and 3, wherein suitable insulating spacing-blocks 24, 25 and 26 are held in place by suitable insulating lacings 24', 25' and 26'.

An important feature of our invention relates to a much improved means for providing passages for a cooling fluid alongside of, and in good heat-exchanging relation to, the straight coil-side portions 20 of the stacks of lightly insulated conductor-strands 22. According to this feature of our invention, as shown in Fig. 4, the major portions of the thickness of at least the two side-portions of the high-voltage ground-insulation coverings 23 comprise stiff insulating spacers 27, having open longitudinally running channels 28 which face the sides of their respective stacked groups of lightly insulated conductor-strands 22. Similar channeled insulating spacers could be used at the tops and bottoms of the respective stacked groups of strands, but we prefer to use solid insulating spacers 29 at the tops and bottoms, as shown in Fig. 4, in order the better to withstand the very great radial forces which are imposed upon the strands in the event of a severe short-circuit.

The rest of each ground-insulation covering 23 is made up by an outer insulating sheathing 30, which forms the outer retaining-layer or layers of each ground-insulation covering 23, binding the whole together, in a compact mass of insulation except for the channels 28, the open sides of which face directly against the substantially bare conductor-strands 22, these strands being substantially bare in the sense that their light strand-insulating coverings do not constitute any serious thermal barrier against the exchange of heat between the strands and the insulating fluid which flows through these channels 28. These channels 28 have openings at their ends, so that the stator-cooling fluid may enter or leave said channels at said ends, as indicated by the arrows 31 in Fig. 1.

It will be noted, from the disposition and arrangement of these channeled insulating spacers 27 which constitute a major portion of the ground-insulation-covering 23 which surrounds each coil-side 20, that the fluid coolant which fills these channels 28 constitutes a major or substantial part of the ground-insulation, which is something quite new in the history of inner-cooled turbine generators. Now, for the first time, it is not necessary to provide a duct-space, in addition to the copper-space, inside of the major-ground-insulation sheathing around the coil-side portions which lie in a slot. Now, the duct-space itself is a part of the ground-insulation. The higher the voltage-rating, the thicker will be the ground-insulation, and the more duct-space there will be, for the inner-cooling.

It is desirable, though perhaps not obligatory, for the cooling fluid which occupies the duct-space or channels 28 to have approximately the same specific inductive capacity, or dielectric constant, as the channeled insulating spacers 27, so that there will be substantially no uneven voltage-distribution along the sides of the insulating strips 32 which bound the sides of the channels 28. When an insulating oil is used as the insulating fluid, it is easy to select a solid insulating material having substantially the same specific inductive capacity as the oil, for making the channeled insulating spacers 27, or an oil may be selected having substantially the same specific inductive capacity as the material of the channeled spacers 27. These spacers could be either porous or nonporous, and if porous, the spacers could be impregnated with the same oil which is used for the insulating fluid, so that all of the pores of the insulating material, and all of the cracks between abutting surfaces of the several insulating pieces 27, 29 and 30, will be filled with the oil, so that the entire body of the ground-insulation 23 acts as if it were a homogeneous dielectric. In this way, there will be no weak points, or strain-points, or paths of excessive voltage-gradient, along which an incipient insulation-failure could more easily commence.

If the cooling fluid is a gas, it would usually not be feasible or possible to exactly match the specific inductive capacity of the gas, which is somewhere near unity, with approximately the same specific inductive capacity in any available solid insulating material out of which the channeled spacers 27 could be constructed, because no presently available solid insulating material has a specific inductive capacity much less than about two. The best that can be done, in such cases, is to make these two specific inductive capacities as nearly equal to each other as is reasonably feasible, regarding this as being a sufficiently reasonable approach to substantial or approximate equality. The electrostatic strains thereby induced will not be excessive.

It will be understood, of course, that the dielectric or insulating strength, or the electric strength, as it is sometimes called, of both the insulating fluid and the channeled insulating spacers 27, shall be sufficient to withstand the maximum imposed potential-gradient thereon, without rupture.

An important feature of our use of channeled insulating spacers 27 is therefore that the cooling fluid is in series with the outer insulating sheathing 30 of the ground-insulation 23, being in fact a major portion of this ground-insulation 23, so that the cooling fluid itself materially increases the total insulation-strength from copper to ground.

While we have described our channeled insulating spacers 27 as having a plurality of open longitudinally running channels 28, facing the side of the stack of copper-strands 22, and while we have described the side walls of these channels 28 as being in the form of insulating strips 32 which are an integral part of the channeled spacer 27, we wish it to be understood that the longitudinally running channels 28 do not need to be separate and distinct from each other, throughout the entire length of the channeled spacers 27, but the strip-portions 32 of these spacers might be any kind of spacer-means for spacing the back wall 33 of each spacer 27 away from the adjacent side of the stack of strands 22, so as to provide the necessary space or spacing through which the insulating fluid may flow, alongside of the stack of strands.

For practical reasons, because of the necessity for making the copper-strands 22 quite thin, in a radial direction, in order to reduce eddy-current heating, it is quite desirable to make the radial height or thickness of the longitudinal ducts or channels 28 greater than the radial height or thickness of a single strand 22, and preferably of the order of from 3 to 10 stacked strands, in order to reduce the very considerable pressure-head which is necessary to force a fluid through a duct having walls which are very close to each other. It is usually desirable that the tall stack or stacks of strands which make up a single coil-side which lies in one of the stator-slots 16 shall be supported laterally, by the insulating strips 32 or their equivalent, at more than two intermediate points along the radial dimension of the stack, which is the reason why the radial height or dimension of each channel 28 would not normally be made higher than 10 stacked strands.

Innercooled stator windings of the prior art have not only been handicapped by the necessity for providing a space for ducts, in addition to the space for copper and the space for ground-insulation, in each of the stator-slots, and by the various practical difficulties which have been encountered in providing this duct-space in one way or another, but there has also been a further serious difficulty, in that no really practical means has heretofore been provided, in inner-cooled stator-windings of turbine generators, to withdraw or to introduce the cooling fluid from or to the innercooling ducts at an intermediate point lying within the axial length of the stator-core. Consequently, it has been necessary, heretofore, whatever may have been the nature of the longitudinal duct-means for directly cooling the copper strands, to continue these ducts all the way through the entire axial length of the stator-core. Since the coolant is getting hotter and hotter, all the time when it passes through such longitudinal ducts, and since the rating of the machine is determined by the hot-point temperature of the ground-insulation or the copper-strands, the ratings of these previously known machines have been severely limited by the excessive lengths of the innercooling ducts for the stator-windings.

An important additional feature of our invention relates to a practical means, which we have discovered and devised, for safely opening up the ground-insulation at one or more intermediate points inside of the stator-core 5, so that the length of each longitudinal duct or channel 28 through which the cooling fluid must pass will no longer be limited by the axial length of the core. It will readily be seen that this feature of our invention, while being perhaps more particularly adapted for use with our new channeled-spacer ground-insulation in which the channels or cooling-ducts 28 constitute an actual part of the ground-insulation, is not limited thereto, but is applicable to any kind of startor innercooling ducts; and contrariwise, our improved stator-innercooling ducts or channels 28 can be used to very great advantage, regardless of the effective length of the several longitudinal ducts or channels.

The difficulty, heretofore, in attempting to provide openings into the ducts of high-voltage innercooled stator-windings, has consisted in providing an adequate length of creepage-path and insulation-strength between the exposed stator-coil conductors and the side walls of the stator-core slots, without providing a fatally weak spot in the ground-insulation between the copper of the conductors and the iron of the stator-core laminations. On the other hand, in dealing with the relatively lower voltages which are encountered in the innercooled rotor-windings of turbine generators, such difficulties have not been at all pressing, so that innercooled rotor-windings have commonly been made with radial discharge-openings in or around the axial center line of the rotor-core. With innercooled stator windings, however, the alternatives seem to have been, either to widely separate the two halves of the stator core, so as to provide, in effect, two axially spaced cores which are separated from each other, or to work with longitudinal sleeves and spacers to provide a tortuous fluid-egress or ingress path inside of each of the winding-receiving stator-core slots. Both of these alternatives have been so impractical that intermediate egress or ingress points for the cooling fluid have not heretofore been applied in any modern high-voltage innercooled stator winding.

As shown in Figs. 1 and 9, we have provided an extremely simple and wholly effective means for providing an ingress or egress point for the cooling fluid of a high-voltage innercooled stator-winding, by the simple expedient of providing a radially short stack or bundle of large-bore central stator-core laminations 12, on either side of a relatively narrow radial ventilating-space 11 between the two halves or bundles of the stator-core laminations. Dovetailed into the large bore 13 of the central laminations 12, as shown in Figs. 7 and 9, is an axially thick insulating diverter-means or block 14, which straddles the radial ventilating space 11. Said diverter-block 14 has a plurality of axially thick insulating teeth or tooth-fillers 34, each of which extends back radially farther than the lamination-teeth 17 of the stator-core. In other words, the large bore 13 of the central laminations 12 has a larger diameter than the bottoms or backs of the stator-core slots 16. The diverter 14, as shown in Figs. 7 and 9, also has insulating slot-fillers or slot-backing layers 35, which are disposed adjacent to said large bore 13, between the insulating teeth or tooth fillers 34, so as to provide insulating continuations of the conductor-receiving core-slots 16.

Said insulating diverter 14 includes suitable duct-means for providing a communication from the ground-insulated coil-sides 20 to the radially extending ventilating-space 11. To this end, at some point well within the confines or axial length or width of the diverter 14, as shown in Fig. 9, the outer insulation-sheathing 30 of the coil-side ground-insulation 23 is provided with one or more openings 36, as shown in Figs. 7 and 9, and the back walls 33 of the channeled insulating spacers 27 are provided with a plurality of openings 37, between the insulating strips 32 which stand between the channels 28. As shown in Fig. 7, these ground-insulation openings 37 and 36 are in communication with transverse ducts 38 which extend crosswise or tangentially through each insulating tooth 34 of the diverter; and these transverse ducts 38 communicate with a centrally disposed radial duct 39, in each insulating tooth 34, for communicating with the radial ventilating space 11 (Fig. 9) between the two bundles 5′ and 5″ of stator-core laminations.

The insulating teeth or tooth-fillers 34 of the diverter-block 14 are also shown as being provided with axially extending side-channels 40 (Fig. 7), for providing a broad communication between the ground-insulation openings 36, 37 and the cross-ducts 38.

As shown in Fig. 8, each insulating tooth or finger 34 is also provided with lateral radial channels 41, communicating with a back channel 42, extending axially across the back of each insulating finger 34, to provide a communication between certain axial stator-core ducts (not shown) which are provided in the stator-core teeth 17, and the radial ventilating-space 11, these stator-core ventilating-ducts having nothing to do with our present invention, which is concerned with the innercooling duct-arrangements.

It will be understood, of course, as shown in Fig. 7, that each of the winding-receiving stator-core slots 16 is closed by a slot-wedge 43, which may or may not be of insulating material. These wedges 43 also extend across the slot-spaces of the insulating teeth 34 of the diverter 14, as shown in Fig. 7.

While we have shown and described our diverter-block 14 as comprising a plurality of fitted-together insulation-pieces 34 and 35, in accordance with an easy way of manufacturing the block, it is to be understood that these pieces could be cemented to each other, or cast integrally with each other, in a single cast insulating block, or otherwise formed to provide, in effect, a single continuous solid piece of insulation, extending all around the bore of the stator-core 5, filling the space which is provided by the larger bore 13 of the central laminations 12.

It will be noted that this diverter-block 14 provides, in effect, an annular insulating piece, which is not laminated like the stator-core, and which is not conducting like the stator-core. This annular insulating piece or diverter 14 is provided with insulating tooth-members 34 and insulating slot-filler members 35 which define insulation-lined slots which firmly receive and support the ground-insulated coil-side portions 20 of the stator-winding. It will be noted that the ground-insulation openings 36 and 37 are provided well inside of these insulation-lined slots of the diverter-block 14, so that there is no difficulty due to weak creepage-distances from the exposed edges of the conductor-strands 22 and the nearest metal lamination of the stator-core 5. Our diverter 14 thus provides for both the mechanical and the dielectric integrity of the stator-winding construction.

While we have described a stator-core 5 which is divided up into only two lamination-bundles 5′ and 5″, which are separated by a relatively narrow radial space 11, it will be possible to provide as many such radial ventilating-spaces as may be desired, at intermediate points along the axial length of the stator-core 5, in which case, an insulating diverter-block 14 would be provided for cooperation with each radial ventilating space 11, in the manner already shown and described.

As has been previously stated, the cooling fluid may flow in either direction through the longitudinally extending innercooling channels 28 of the stator winding. By way of illustrating a concrete construction, in Fig. 1, we have indicated, by arrows, that the radial ventilating-space 11 is a fluid-discharging space, so that the ventilating fluid is discharged into the space 44 between the outer periphery of the stator-core 5 and the outer periphery of the enclosing housing 6. From this space, the fluid is discharged into an external pipe 45, which leads first into the heat-exchanger 10 and then through the pump P, from which the fluid is returned into each of the end-bell spaces 46 and 47 at the respective ends of the stator-core 4, inside of the stator-housing 6. This fluid entirely fills these end-bell spaces, where it bathes the essentially bare end-winding conductors 21, cooling the same, after which the fluid enters the open ends of the longitudinal channels 28 in the ground insulation, as indicated by the arrows 31 in Fig. 1. If the cooling fluid is an insulating liquid or oil, no particular baffling or agitating means may be needed, in the general case, for directing the fluid against the outer surfaces of the essentially bare end-conductors 21, or for increasing the rate of flow of the fluid over these surfaces; but if the cooling-fluid is a gas, it will usually be necessary to provide such baffling or agitating means (not shown), the details of which form no part of our present invention.

Fig. 5 shows a construction similar to Fig. 4, except for a two-turn coil, while Fig. 6 shows the construction of an exemplary three-turn coil. These multi-turn-coil constructions differ from the single-turn-coil construction of Fig. 4 in having a relatively light between-turns insulating wrapping 48 around the coil-side 20 of each turn, to bind together the conductor-strands 22 and the channeled insulating spacers 27 of the coil-side of that turn, for convenience in handling. The solid ground-insulation spacers 29, at the top and bottom of the multi-turn coil-side, may be added before the application of the outer insulating sheathing 30 for each multiturn coil-side, as shown in Figs. 5 and 6.

In the general case, the rotor member 2 of any turbine generator which has stator innercooling will also be innercooled.

In the machine which is chosen for illustration in Fig. 1, it will be seen that the rotor member 2 has a solid or unlaminated rotor-core 50, which has a cylindrical outer periphery, which is provided with winding-receiving slots 51 for receiving the low-voltage direct-current field-windings 52 of the rotor. As is now the practically universal rule, in rotor-ventilation, the central portion of the rotor-core 50 is provided with radial ventilating-holes 53, which discharge the ventilating fluid, usually hydrogen, into the air gap 54, inside of the cylindrical partition 3 in the particular machine which is shown in Fig. 1. The hydrogen is drawn out from each end of the air gap 54 by means of a suitable multistage axial-flow fan 55, 56, respectively, and discharged into and through a cooler or heat-exchanger 57, 58, of any suitable type or arrangement, whence the cooled hydrogen is returned to the respective ends of the rotor-winding, as indicated by the arrows 59.

The rotor member 2 is mounted in its own housing 60, which is shown in the form of two end-brackets 61, 62 respectively, which are secured to the end-pieces of the stator-housing 6, and which enclose the coolers 57 and 58. These end brackets 61 and 62 carry bearings 63, which support the rotor-shaft 64, and suitable gland-seals 65 for keeping the rotor-enclosure substantially gas-tight, in a manner which is well known.

It will be understood that, while we have illustrated our machine as being provided with the air-gap cylindrical partition 3 which divides the stator and rotor spaces into two separate enclosures, which are capable of housing two different cooling-fluid fillings, having either different compositions or different fluid-pressures, and while our invention makes a particularly advantageous innercooling arrangement for innercooling the stator-winding 18 with oil or other insulating liquid, our invention is not by any means limited to this precise arrangement. We wish it to be understood, therefore, that, in the broader aspects of our invention, it is altogether feasible to omit the cylindrical partition 3, and to omit one of the two illustrated fluid-recirculating and cooling systems, using a single cooling fluid for ventilating both the stator and the rotor. Such a single fluid would usually be hydrogen at some suitable pressure such as 45 pounds per square inch above atmospheric pressure, or more.

We claim as our invention:

1. A dynamo-electric machine having a stator member and a rotor member, said stator member including a laminated stator core comprising a plurality of groups of laminations spaced apart to provide at least one radial ventilating space between adjacent groups of laminations, said laminations being annular and having internal radial teeth defining a central bore and providing longitudinal slots between the teeth, a plurality of annular laminations immediately adjacent each side of said ventilating space, said last-mentioned laminations providing a central bore of greater diameter than the diameter at the bottoms of said slots, a stator winding comprising a plurality of coils having coil side portions disposed in said slots, at least said coil side portions having an insulating covering thereon for insulating the coil side portions from the stator core, said insulating covering and coil side portions providing ducts extending longitudinally of the slots inside the insulating covering, insulating diverter members disposed in the bore of the last-mentioned laminations and extending across the ventilating space, said diverter members having slot portions aligned with the slots of the stator core for receiving said coil side portions and having duct means communicating with the ventilating space, said insulating coverings of the coil side portions having openings therethrough within the slot portions of the diverter members providing communication between said longitudinal ducts and the duct means of the diverter members, and means for causing an insulating cooling fluid to flow through said ducts.

2. A dynamo-electric machine having a stator member and a rotor member, said stator member including a laminated stator core comprising a plurality of groups of laminations spaced apart to provide at least one radial ventilating space between adjacent groups of laminations, said laminations being annular and having internal radial teeth defining a central bore and providing longitudinal slots between the teeth, a plurality of annular laminations immediately adjacent each side of said ventilating space, said last-mentioned laminations providing a central bore of greater diameter than the diameter at the bottoms of said slots, a stator winding comprising a plurality of coils having coil side portions disposed in said slots, at least said coil side portions having an insulating covering thereon for insulating the coil side portions from the stator core, said insulating covering and coil side portions providing ducts extending longitudinally of the slots inside the insulating covering, insulating diverter members disposed in the enlarged bore of the last-mentioned laminations and extending across the ventilating space, said diverter members having tooth portions defining slots aligned with the slots of the stator core for receiving said coil side portions, said tooth portions having generally radial duct means therein communicating with the ventilating space and extending to the surface of the insulating covering of the coil side portions, the insulating coverings having openings therethrough within the slot portions of the diverter members providing communication between said longitudinal ducts and the duct means of the diverter members, and means for causing an insulating cooling fluid to flow through said ducts.

3. A dynamo-electric machine having a stator member and a rotor member, said stator member including a laminated stator core having a central bore and a plurality of peripheral slots extending longitudinally of said bore, a stator winding comprising a plurality of coils having coil side portions disposed in said slots and end turn portions extending beyond the ends of the core, said coil side portions being covered with high-voltage ground insulation to insulate the coil side portions from the stator core, the ground insulation terminating shortly beyond the ends of the stator core and the end turn portions of the coils being essentially bare, insulating means for supporting the end turn portions and spacing them apart, said ground insulation on each coil side portion having a plurality of longitudinal channels on the inner surface thereof immediately adjacent the coil side portion forming ducts extendng continuously from end to end of the coil side portion, and means for circulating a cooling and insulating fluid through said ducts and over said coil end turn portions.

4. A dynamo-electric machine having a stator member and a rotor member, said stator member including a laminated stator core having a central bore and a plurality of peripheral slots extending longitudinally of said bore, a stator winding comprising a plurality of coils having coil side portions disposed in said slots and end turn portions extending beyond the ends of the core, said coil side portions being covered with high-voltage ground insulation to insulate the coil side portions from the stator core, the ground insulation terminating shortly beyond the ends of the stator core and the end turn portions of the coils being essentially bare, insulating means for supporting the end turn portions and spacing them apart, said ground insulation on each coil side portion including a plurality of channel members extending longitudinally of the coil side portion with their open sides immediately adjacent the coil side portions to form continuous ducts extending from end to end of the coil side portion, and an outer insulating sheathing covering the coil side portion and channel members, and means for circulating a cooling and insulating fluid through said ducts and over said coil end turn portions.

5. A dynamo-electric machine having a stator member and a rotor member, said stator member including a laminated stator core having a central bore and having internal radial teeth defining longitudinal slots between them, said stator core having at least one radial vent space between adjacent laminations, a stator winding comprising a plurality of coils having coil side portions disposed in said slots and end turn portions extending beyond the ends of the core, said coil side portions being covered with high-voltage ground insulation to insulate the coil side portions from the stator core, the ground insulation terminating shortly beyond the ends of the stator core and the end turn portions of the coils being essentially bare, insulating means for supporting the end turn portions and spacing them apart, said ground insulation on each coil side portion having a plurality of longitudinal channels on the inner surface thereof immediately adjacent the coil side portion forming ducts extending continuously from end to end of the coil side portion, insulating diverter means in the core radially aligned with said vent space, the coil side portions extending through said diverter means and being insulated thereby from the core, the diverter means having duct means extending therethrough and communicating with the vent space in the core, the ground insulation on each coil side having openings therethrough within the diverter means providing communication between said longitudinal ducts and the duct means of the diverter means, and means for circulating a cooling and insulating fluid through said ducts and duct means and over said coil end turn portions.

6. A dynamo-electric machine having a stator member and a rotor member, said stator member including a laminated stator core having a central bore and having internal radial teeth defining longitudinal slots between them, said stator core having at least one radial vent space between adjacent laminations, a stator winding comprising a plurality of coils having coil side portions disposed in said slots and end turn portions extending beyond the ends of the core, said coil side portions being covered with high-voltage ground insulation to insulate the coil side portions from the stator core, the ground insulation terminating shortly beyond the ends of the stator core and the end turn portions of the coils being essentially bare, insulating means for supporting the end turn portions and spacing them apart, said ground insulation on each coil side portion including a plurality of channel members extending longitudinally of the coil side portion with their open sides immediately adjacent the coil side portions to form continuous ducts extending from end to end of the coil side portion, and an outer insulating sheathing covering the coil side portion and channel members, insulating diverter means in the core radially aligned with said vent space, the coil side portions extending through said diverter means and being insulated thereby from the core, the diverter means having duct means extending therethrough and communicating wtih the vent space in the core, the ground insulation on each coil side having openings therethrough within the diverter means providing communication between said longitudinal ducts and the duct means of the diverter means, and means for circulating a cooling and insulating fluid through said ducts and duct means and over said coil end turn portions.

References Cited in the file of this patent

UNITED STATES PATENTS

| | | |
|---|---|---|
| 2,573,670 | Moses | Oct. 30, 1951 |
| 2,749,457 | Kilner | June 5, 1956 |

FOREIGN PATENTS

| | | |
|---|---|---|
| 514,248 | Belgium | Oct. 15, 1952 |
| 713,152 | Great Britain | Aug. 4, 1954 |